(12) United States Patent
Wang et al.

(10) Patent No.: US 9,332,067 B2
(45) Date of Patent: May 3, 2016

(54) LOAD SHARING METHOD AND APPARATUS

(71) Applicant: ZTE Corporation, Shenzhen, Guangdong (CN)

(72) Inventors: Feng Wang, Shenzhen (CN); Guixiang Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/763,276

(22) PCT Filed: Sep. 16, 2013

(86) PCT No.: PCT/CN2013/083587
§ 371 (c)(1),
(2) Date: Jul. 24, 2015

(87) PCT Pub. No.: WO2014/114097
PCT Pub. Date: Jul. 31, 2014

(65) Prior Publication Data
US 2015/0373094 A1    Dec. 24, 2015

(30) Foreign Application Priority Data
Jan. 28, 2013    (CN) .......................... 2013 1 0032141

(51) Int. Cl.
*G06F 15/173* (2006.01)
*H04L 29/08* (2006.01)
*H04L 29/12* (2006.01)

(52) U.S. Cl.
CPC ........ *H04L 67/1008* (2013.01); *H04L 61/2061* (2013.01); *H04L 61/256* (2013.01); *H04L 61/2532* (2013.01); *H04L 61/2514* (2013.01)

(58) Field of Classification Search
CPC ............ H04L 61/2061; H04L 61/2532; H04L 61/256; H04L 67/1008

USPC ................................................. 709/213, 223
See application file for complete search history.

(56) References Cited

U.S. PATENT DOCUMENTS 7,127,504 B2 * 10/2006 Jacob .................. H04L 12/2602
370/229
8,289,968 B1    10/2012 Zhuang
(Continued)

FOREIGN PATENT DOCUMENTS

CN            1553341 A     12/2004
CN         101227398 A      7/2008
(Continued)

OTHER PUBLICATIONS

International Search Report in international application No. PCT/CN2013/083587, mailed on Dec. 26, 2013.
(Continued)

*Primary Examiner* — Jerry Dennison
(74) *Attorney, Agent, or Firm* — Oppedahl Patent Law Firm LLC

(57) ABSTRACT

Provided is a load sharing method, including that public network addresses are configured in a form of address pools; after traffic transmitted by user devices is received, the user devices are grouped according to traffic models transmitted by the user devices; CPU allocate the public network addresses to the user devices and translate private network addresses of the user devices into the public network addresses, wherein each of the address pools includes a plurality of address blocks, each of the plurality of address blocks corresponds to one CPU, each user group includes a plurality of user blocks, and each of the plurality of user blocks corresponds to one CPU. A load sharing apparatus is also provided. Thus, uneven sharing of public network address resources among a plurality of CPUs and loads of user devices can be avoided, thereby not only improving the processing speed of the CPUs for address translation, but also obtaining an excellent load sharing effect.

18 Claims, 2 Drawing Sheets

(56) References Cited

U.S. PATENT DOCUMENTS

| | | | |
|---|---|---|---|
| 8,429,257 B2* | 4/2013 | Ait-Ameur | H04L 61/2053 370/331 |
| 9,137,198 B2* | 9/2015 | Baniqued | H04L 41/0803 |
| 2005/0097223 A1* | 5/2005 | Shen | H04L 29/12283 709/245 |
| 2005/0122946 A1 | 6/2005 | Won | |
| 2009/0154406 A1* | 6/2009 | Kim | H04L 29/12283 370/329 |
| 2010/0223466 A1* | 9/2010 | Roskowski | H04L 1/1685 713/168 |
| 2011/0235788 A1* | 9/2011 | Jesse | H04L 51/14 379/88.22 |
| 2011/0238793 A1* | 9/2011 | Bedare | H04L 29/12283 709/220 |
| 2013/0166776 A1 | 6/2013 | Gao | |

FOREIGN PATENT DOCUMENTS

| | | |
|---|---|---|
| CN | 102202104 A | 9/2011 |
| CN | 102594933 A | 7/2012 |
| CN | 102694873 A | 9/2012 |
| CN | 102821165 A | 12/2012 |
| CN | 103117947 A | 5/2013 |
| EP | 2608491 A1 | 6/2013 |
| WO | 2005050897 A2 | 6/2005 |

OTHER PUBLICATIONS

English Translation of the Written Opinion of the International Search Authority in international application No. PCT/CN2013/083587, mailed on Dec. 26, 2013.

Extending the IP internet through address reuse, mailed on Jan. 1, 1993.

[Behave] pRE: CGN REQ: Shared address pool, mailed on Mar. 27, 2011.

Supplementary European Search Report in European application No. 13872335.8, mailed on Jan. 29, 2016.

* cited by examiner

LOAD SHARING METHOD AND APPARATUS

TECHNICAL FIELD

The present disclosure relates to a load sharing technology in network communication, and particularly to a load sharing method and apparatus.

BACKGROUND

Network Address Translation (NAT), which is a translation technology for translating a private address into a legal Internet Protocol (IP) address, has been widely applied in various types of Internet access methods and various types of networks. NAT enables a plurality of private network computers to share an Internet link, thereby well solving the problem of shortage of resources of public IP addresses.

A Carrier Grade NAT (CGN) device, which is a device deployed in an operator, improves smooth transition from Internet Protocol Version 4 (IPv4) to Internet Protocol Version 6 (IPv6) and promotes an evolution process by integrating a plurality of evolution mechanisms including tunneling and NAT. Translation forms of CGN include: translation from a private network IPv4 address to a public network IPv4 address, translation from a private network IPv4 address to IPv6 address, and translation from IPv6 address to a public IPv4 address, and so on. An independent processing unit is mostly applied in order to improve CGN performance. The processing unit may be a single-core processing unit or a multi-core processing unit. Currently, the multi-core processing unit applies a form of load sharing so as to optimize the performance of a Central Processing Unit (CPU) of the multi-core processing unit.

The load sharing includes load sharing of resources of public network addresses and load sharing of user devices. The resources of the public network addresses may be hashed to different CPUs by a HASH method so that an effect of balanced load sharing is implemented for allocation of the resources of the public network addresses and the user devices. However, relatively high performance is required for a forwarding unit and a processing unit of CGN if hashing is performed by a single public network address resource. If hashing is performed by a fixed public network address block, there is a relatively large performance difference of address translation of CGN because of different numbers of processing units of CGN and different numbers of CPUs included in each processing unit, and there is a problem of poor load sharing.

SUMMARY

In view of this, a major purpose of embodiments of the present disclosure is to provide a load sharing method and apparatus so as to solve the problem of uneven load sharing of NAT on a plurality of CPUs.

A technical solution of an embodiment of the present disclosure is implemented by the following way in order to achieve the purpose.

An embodiment of the present disclosure provides a load sharing method. The method includes that:

public network addresses are configured in a form of address pools;

after traffic transmitted by user devices is received, the user devices are grouped according to traffic models transmitted by the user devices; Central Processing Units (CPU) allocate the public network addresses for the user devices, and translate private network addresses of the user devices into the public network addresses, wherein each of the address pools includes a plurality of address blocks, each of the plurality of address blocks corresponds to one CPU, each user group includes a plurality of user blocks, and each of the plurality of user blocks corresponds to one CPU.

In the solution, the method may further include that:

a public network address resource load sharing marker table is generated according to address resource data links corresponding to the address pools; a user device load sharing marker table is generated according to user data links corresponding to user groups, wherein the address resource data links are generated according to the address pools and the user data links are generated according to the user groups;

load sharing control information generated according to the public network address resource load sharing marker table and the user device load sharing marker table is transmitted to the CPUs;

correspondingly, the operation that the CPUs allocate the public network addresses for the user devices, and translate the private network addresses of the user devices into the public network addresses may include that:

the CPUs allocate, according to the received load sharing control information, the public network addresses for the user devices, and translate the private network addresses of the user devices into the public network addresses.

In the solution, each of the CPUs may correspond to substantially the same number of public network addresses in each of the address pools, and a specific implementation method may include that:

a number of public network addresses are allocated to each of the CPUs, wherein the number of the allocated public network addresses is the product of multiplying an integer value, which is acquired by dividing the total number of public network addresses of a current address pool by the square of the number of the CPUs, by the number of the CPUs; if there are still remaining public network addresses, a number of public network addresses are allocated to each of the CPUs, wherein the number of the allocated public network addresses is an integer value acquired by dividing the remaining the public network addresses by the number of the CPUs; if there are still remaining public network addresses, the remaining public network addresses in each of the address pools are transmitted as a whole so as to make each of the CPUs correspond to substantially the same number of public network addresses.

In the solution, the CPUs may share substantially the same number of user devices, and a specific implementation method may include that:

a number of user devices are allocated to each of the CPUs, wherein the number of the allocated user devices is the product of multiplying an integer value, which is acquired by dividing the total number of user devices of a current user group by the square of the number of the CPUs, by the number of the CPUs; if there are still remaining user devices, a number of user devices are allocated to each of the CPUs, wherein the number of the allocated user devices is an integer value acquired by dividing the remaining user devices by the number of the CPUs; if there are still remaining user devices, the remaining user devices in each user group are transmitted as a whole so as to allocate substantially the same number of user devices to each of the CPUs.

In the solution, each of the address pools may correspond to one public network address resource data link, the number of nodes of the public network address resource data link may be the number of CPUs, each of the nodes may correspond to one CPU, and each of the nodes may include a block mark and a tail mark.

In the solution, each user group may correspond to one user data link, the number of nodes of the user data link may be the number of CPUs, each of the nodes may correspond to one CPU, and each of the nodes may include a block mark and a tail mark.

An embodiment of the present disclosure further provides a load sharing apparatus. The load sharing apparatus includes a load sharing configuration module, a load sharing control module and CPUs, wherein the load sharing configuration module is configured to configure public network addresses in a form of address pools, and to group user devices according to traffic models transmitted by the user devices;

wherein each of the address pools includes a plurality of address blocks, each of the plurality of address blocks corresponds to one CPU, each user group includes a plurality of user blocks, and each of the plurality of user blocks corresponds to one CPU.

the load sharing control module is configured to transmit load sharing control information to the CPUs; and the CPUs are configured to allocate the public network addresses for the user devices according to the received load sharing control information, and translate private network addresses of the user devices into the public network addresses.

In the solution, the load sharing control module may be configured to generate, according to public network address resource data links, a public network address resource load sharing marker table; and to generate, according to user data links, a user device load sharing marker table, and deliver to the CPUs, the load sharing control information generated according to the public network address resource load sharing marker table and the user device load sharing marker table.

In the solution, each of the address pools may correspond to one public network address resource data link, the number of nodes of the public network address resource data link may be the number of CPUs, each of the nodes may correspond to one CPU, and each of the nodes may include a block mark and a tail mark;

each user group may correspond to one user data link, the number of nodes of the user data link may be the number of CPUs, each of the nodes may correspond to one CPU, and each of the nodes may include a block mark and a tail mark.

In the solution, the load sharing configuration module and the load sharing control module may be set in a CGN device.

According to a load sharing method and apparatus provided by the embodiments of the present disclosure, public network addresses are configured in a form of address pools so that CPUs correspond to substantially the same number of public network addresses in each of the address pools; after traffic transmitted by user devices is received, the user devices are grouped according to traffic models transmitted by the user devices so that the CPUs share substantially the same number of user devices; the CPUs allocate the public network addresses to the user devices and translate private network addresses of the user devices into the public network addresses, thus solving the problem of uneven sharing of public network address resources on different CPUs and loads of user devices, while reducing the influence caused by addition and deletion of some public network address resources and user devices on the overall CGN performance. Technical solutions provided by the embodiments of the present disclosure are capable of not only improving the processing speed of the CPUs for address translation, but also implementing an effect of balanced loads on different CPUs.

DETAILED DESCRIPTION

The present disclosure will be further expounded below in combination with the accompanying drawings and specific embodiments.

Figure 1:
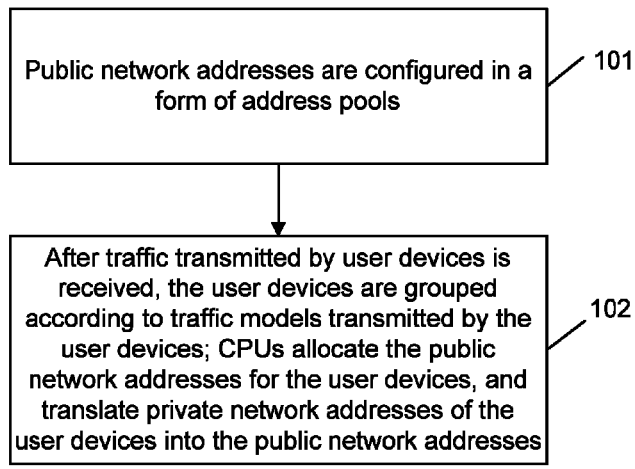
FIG. 1 is a schematic diagram of an implementation process of a load sharing method according to an embodiment of the present disclosure.

FIG. 1 is a schematic diagram of an implementation process of a load sharing method according to an embodiment of the present disclosure. As shown in FIG. 1, the method includes the following steps.

Step 101 includes that public network addresses are configured in a form of address pools;

wherein each of the address pools includes a plurality of address blocks and each of the plurality of address blocks corresponds to one CPU.

A plurality of address pools are set in the embodiment of the present disclosure. The number of the address pools may be determined according to a practical requirement. Each of the address pools includes several public network addresses. Each of the address pools may include the same number of public network addresses, and may also include different number of public network addresses, and each of the address pools includes public network addresses corresponding to each of the CPUs. Each of the CPUs corresponds to substantially the same number of public network addresses in each of the address pools. For example, there are three address pools which respectively are address pool A, address pool B and address pool C, two CPUs which respectively are CPU1 and CPU2, and twelve public network addresses. Here, the number of public network addresses included respectively in address pool A, address pool B and address pool C may be configured flexibly. In other words, address pool A, address pool B and address pool C may include different number of public network addresses. For example, address pool A includes eight public network addresses, address pool B includes three public network addresses and address pool C includes one public network address. Ideally, address pool A, address pool B and address pool C include four public network addresses respectively, and in each of the address pools, two public network addresses correspond to CPU1 and two public network addresses correspond to CPU2.

Step 102 includes that after traffic transmitted by user devices is received, the user devices are grouped according to traffic models transmitted by the user devices. CPUs allocate the public network addresses for the user devices, and translate private network addresses of the user devices into the public network addresses, wherein each user group includes a plurality of user blocks and each of the plurality of user blocks corresponds to one CPU. The traffic models may be traffic models applied in an existing transmission technology.

Here, when the user devices are grouped, the CPUs are made to share as substantially the same number of user devices as possible so as to ensure balanced loads of the CPUs. The public network addresses allocated by the CPUs for the user devices are from the public network addresses corresponding to the CPUs in the address pools.

Specifically, the CPUs allocate the public network addresses for the user devices according to load sharing control information, wherein the load sharing control information includes a public network address resource load sharing marker table generated according to public network address resource data links and a user device load sharing marker table generated according to user data links. Here, the public network address resource data links refer to link table structures for recording conditions of public network addresses allocated to the CPUs in the address pools. The user data links refer to link table structures including load conditions of the user devices.

Figure 2:
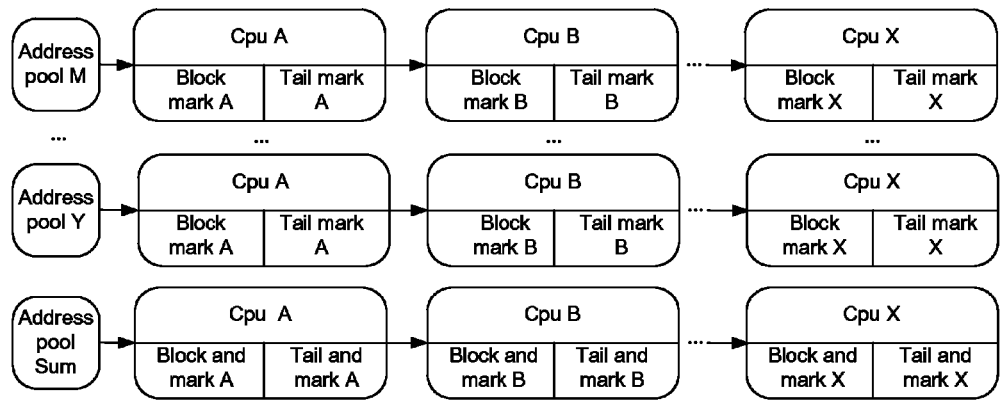
FIG. 2 is a structural diagram of a public network address resource data link according to an embodiment of the present disclosure.

In practical application, the operation that the public network addresses are configured in the form of the address pools is as shown in FIG. 2. All preconfigured public network addresses are divided in a form of address pools. Here, the address pools may include the same total number of public network addresses, or may include different total numbers of public network addresses. However, each of the CPUs corresponds to a plurality of address pools, and CPUs should correspond to substantially the same number of public network addresses in each of the address pools. Specifically, a method for reaching substantially the same number of public network addresses corresponding to CPUs for each of the address pools after an address pool is selected includes that:

public network addresses are allocated for a first time; a number of public network addresses are allocated to each of the CPUs, wherein the number of the allocated public network addresses in the first time is the product of the number of the CPUs multiplied by an integer value which is acquired by dividing the total number of public network addresses of a current address pool by the square of the number of the CPUs; if there are still remaining public network addresses, public network addresses are allocated for a second time to allocate a number of public network addresses to each of the CPUs, wherein the number of the allocated public network addresses in the second time is an integer value acquired by dividing the remaining the public network addresses by the number of the CPUs; if there are still remaining public network addresses, the remaining public network addresses are processed separately; however, at most one public network address is allocated to each of the CPUs during an allocation process, that is, zero or one public network address is allocated to each of the CPUs during the third allocation of the public network addresses.

The operation that the remaining public network addresses are processed separately includes that the remaining public network addresses in each of the address pools are allocated as a whole so that each of the CPUs corresponds to substantially the same number of public network addresses.

Here, the remaining public network addresses are processed as a whole because a load on CPU A is relatively heavy if there is one remaining public network address respectively in address pool A, address pool B and address pool C and each of the address pools allocates its remaining one public network address to CPU A. If the remaining public network addresses are allocated as a whole, address pool A may allocate the remaining one public network address of the address pool to CPU A, address pool B may allocate the remaining one public network address of the address pool to CPU B and address pool C may allocate the remaining one public network address of the address pool to CPU C, thereby allocating a more balanced number of public network addresses to each of the CPUs.

As shown in FIG. 2, each of the address pools corresponds to one public network address resource data link. The number of nodes of the public network address resource data link is the number of CPUs, and a node of each public network address resource data link corresponds to one CPU. Each of the nodes includes a block mark and a tail mark, wherein the block mark is for recording address blocks and the number of the address blocks allocated for a first time by a CPU corresponding to the associated node, and for recording address blocks and the number of the address blocks allocated for a second time by the CPU corresponding to the associated node.

The tail mark is for recording the number of the public network addresses acquired by the CPU corresponding to the associated node from the third allocation. In addition, zero or one public network address is acquired from the third allocation, that is, the tail mark of each of the nodes is 0 or 1.

Here, the address pools use the address blocks as units, and the size of the address blocks is changeable. The size of the address blocks represents the number of public network addresses included in each of the plurality of address blocks. The size of the address blocks allocated for the first time is different from the size of the address blocks allocated for the second time, wherein the first allocation includes that a number of public network addresses are allocated to each of the CPUs, wherein the number of the allocated public network addresses is the product of multiplying the number of the CPUs by an integer value which is acquired by dividing the total number of public network addresses of a current address pool by the square of the number of the CPUs, wherein the size of the address blocks allocated for the first time is the number of the CPUs. The number of address blocks included in each of the CPUs is an integer value acquired by dividing the total number of public network addresses of an address pool by the square of the number of the CPUs so that each of the CPUs contains the same number of address blocks.

It needs to be pointed out here that, the size of the address blocks allocated for the first time is related to a plurality of variables including the number of the CPUs, the total number of the public network address in the address pools and so on. Therefore, the size of the address blocks allocated for the first time may be set as a function variable. The size of the address blocks allocated for the first time may have a plurality of alternatives.

The second allocation includes that, if there are still remaining public network addresses after the first allocation, a number of public network addresses are allocated to each of the CPUs, wherein the number of the allocated public network addresses in the second allocation is an integer value acquired by dividing the number of remaining public network addresses by the number of the CPUs, wherein the number of the address blocks allocated for the second time is an integer value acquired by dividing the total number of public network addresses remained after the first allocation by the number of the CPUs, and each of the CPUs includes one address block allocated for the second time.

If there are still public network addresses remained after the second allocation, the remaining public network addresses are processed separately. The operation that the remaining public network addresses are processed separately includes that: the remaining public network addresses in each of the address pools are allocated as a whole so that the CPUs correspond to substantially the same number of public network addresses. At most one public network address is allocated to each of the CPUs during an allocation process, that is zero or one public network address is allocated to each of the CPUs during the allocation process.

Specifically, all address pools may be maintained by a data link table. Each of the nodes of the data link table corresponds to all address pools and corresponds to one CPU. The number of nodes of the link table is the number of CPUs, and each of the nodes of the link table includes a block and a mark, as well as a tail and a mark.

Here, the block and the mark of each of the nodes of the link table are for recording the sum of the total numbers of the public network addresses allocated for the first time and for the second time corresponding to the CPUs in each of the address pools. That is, the block and the mark of each of the nodes of the link table are for recording the sum of the products of multiplying the sizes of the address blocks by the number of the address blocks allocated for the first time to the corresponding CPUs in the address pools, and are for recording the sum of the products of multiplying the sizes of the address blocks by the number of the address blocks allocated for the second time to the corresponding CPUs in the address pools.

The tail and the mark of each of the nodes of the link table are for recording the sum of tail marks corresponding to the CPUs in the address pools.

The data link table is configured to judge a CPU on which a public network address is to be added or deleted. Addition is performed preferentially on a CPU corresponding to a node having a small tail and mark if a public network address needs to be added, and deletion is performed preferentially on a CPU corresponding to a node having a large tail and mark if a public network address needs to be deleted, thereby ensuring balance of allocation of public network addresses and loads of the CPUs.

Specifically, addition is performed preferentially on a CPU corresponding to a node having a tail mark of 0 if a public network address needs to be added, and deletion is performed preferentially on a CPU corresponding to a node having a tail mark of 1 if a public network address needs to be deleted randomly when a single address pool is maintained.

The operation that the addition is performed preferentially on the CPU corresponding to the node having a tail mark of 0 if the public network address needs to be added, and the deletion is performed preferentially on the CPU corresponding to the node having a tail mark of 1 if the public network address needs to be deleted randomly when the single address pool is maintained includes that:

if the public network address needs to be added to the address pool, the public network addresses remained after the second allocation are combined with the added public network address, and the combined public network addresses are allocated for a first time and for a second time;

if one public network address is deleted from the address pool, a node where a pre-deleted public network address is located is searched, and whether a tail mark of the node is 1 is checked, and if it is 1, the public network address is deleted and the tail mark of the node is updated from 1 to 0; if it is not 1, an operation in a situation that the number of public network addresses deleted from the address pool is larger than the number of the address blocks allocated for the first time is executed.

If the number of the public network addresses deleted from the address pool is larger than 1, and smaller than or equal to the number of the address blocks allocated for the first time and if pre-deleted public network addresses are distributed on different nodes, and tail marks of the nodes on which the pre-deleted public network addresses are distributed are 1, then the pre-deleted public network addresses are deleted and the tail marks of the nodes on which the pre-deleted public network addresses are distributed are updated from 1 to 0. If not all pre-deleted public network addresses are distributed on different nodes or not all tail marks of the nodes where the pre-deleted public network addresses are distributed are 1, then an operation in a situation that the number of the public network addresses deleted from the address pool is larger than the number of the address blocks allocated for the first time is executed.

If the number of the public network addresses deleted from the address pool is larger than the number of the address blocks allocated for the first time, then the public network addresses are reallocated according to a difference between the total number of the original public network addresses of the address pool and the number of the pre-deleted public network addresses.

For example, when only one address pool is configured and the address pool corresponds to 97 public network addresses totally, generation and updating of a public network address resource data link will be provided below respectively in the case that there is only one CPU or there are two CPUs, i.e. CPU A and CPU B.

When there is only one CPU, there is one address block having a size of 97, and a tail mark of the public network address resource data link is 0.

When there are two CPUs, the size of address blocks is 2. Provided that the two CPUs correspond to node A and node B, then the node corresponding to CPU A includes a block mark A and a tail mark A, and CPU B includes a block mark B and a tail mark B. When allocation is performed for a first time, the size of address blocks allocated to each of the CPUs is 2, and there are 24 address blocks. Allocation is performed for a second time if there is 1 remaining address. After all public network addresses are allocated, the sizes of address blocks of the block mark A and the block mark B are 2, there are 24 address blocks, the tail mark A is 1 and the tail mark B is 0.

If one public network address is deleted at the moment, and the pre-deleted public network address is in CPU A, then the public network address is deleted, and the tail mark A is modified into 0. If two public network addresses are deleted, but both two pre-deleted public network addresses are at CPU A, public network addresses are reallocated, that is the size of new address blocks is 2. The size of address blocks of both CPU A and CPU B is respectively 2, and the number of address blocks of both CPU A and CPU B is respectively 23 when allocation is performed for the first time. The size of address blocks of both CPU A and CPU B is respectively 1, the number of addresses is respectively 1, the tail mark A is 1 and the tail mark B is 0 when allocation is performed for the second time.

It may be learned from the foregoing that, public network address resources are loaded in a balanced manner on different CPUs, and the difference of the number of addresses is 1 at most and not affected by the number of processing units. Here, each processing unit may include different number of CPUs. Generation and updating of a user data link are similar, which will not be described repeatedly here.

Figure 3:
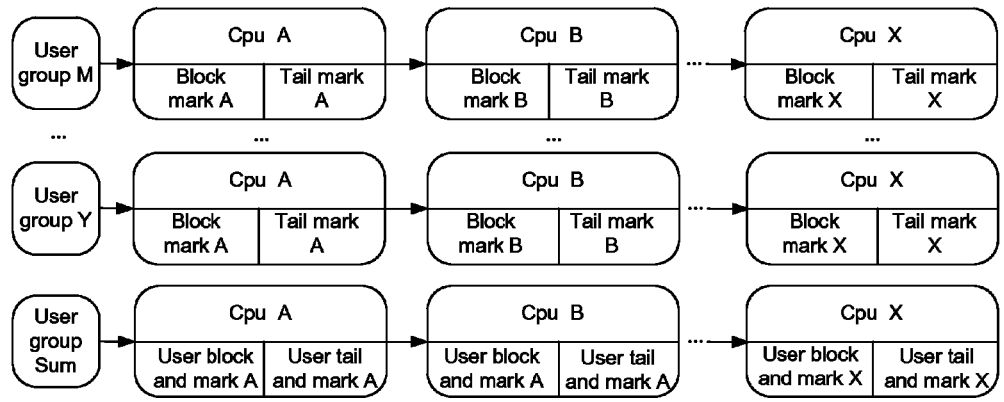
FIG. 3 is a schematic diagram of a user data link according to an embodiment of the present disclosure.

In practical application, the user devices are grouped. As shown in FIG. 3, all user devices transmitting traffic within a certain time internal are grouped according to traffic models transmitted by the user devices. Here, the total number of user devices included in user groups may be different. However, each of the CPUs corresponds to a plurality of user groups, and each of the CPUs corresponds to substantially the same number of user devices in each user group. A method for reaching substantially the same number of user devices corresponding to each of the CPUs for each user group after a user group is selected includes that:

allocation is performed for a first time, a number of user devices are allocated to each of the CPUs, wherein the number of the allocated user devices is the product of multiplying the number of the CPUs by an integer value acquired by dividing the total number of user devices of a current user group by the square of the number of the CPUs; allocation is performed for a second time if there are still remaining user devices to allocate a number of user devices to each of the CPUs, wherein the number of the allocated user devices in the second allocation is an integer value acquired by dividing the number of the remaining user devices by the number of the CPUs; if there are still remaining user devices, the remaining user devices are processed separately. The operation that the remaining user devices are processed separately includes that: the remaining user devices in each user group are allocated as a whole so that the CPUs are allocated with substantially the same number of user devices. At most one user device is allocated to each of the CPUs during an allocation process. That is, zero or one user device is allocated to each of the CPUs during the third allocation process.

Here, the user groups are divided by a certain time interval as a unit.

FIG. 3 is a schematic diagram of user data according to an embodiment of the present disclosure. As shown in FIG. 3, user terminals transmitting traffic within a certain time interval are divided into a plurality of user groups, each of which corresponds to a user data link. The number of nodes of the user data link is the number of CPUs. The nodes of the user data link correspond to the CPUs. Each of the nodes includes a block mark and a tail mark, wherein the block mark is for recording user blocks and the number of the user blocks allocated for a first time by a CPU corresponding to the associated node, and for recording user blocks and the number of the user blocks allocated for a second time by the CPU corresponding to the associated node.

The tail mark is for recording the number of user devices acquired by the CPU corresponding to the associated node from the third allocation. In addition, zero or one user device is acquired from the third allocation.

Here, the user groups use the user blocks as units, and the size of the user blocks are changeable. The size of the user blocks represents the number of user devices included in each of the plurality of user blocks. The size of the user blocks allocated for the first time is different from the size of the user blocks allocated for the second time, wherein the first allocation includes that a number of user devices are allocated to each of the CPUs, wherein the number of the allocated user devices is the product of the number of the CPUs multiplied by an integer value acquired by dividing the total number of user devices of a current user group by the square of the number of the CPUs, wherein the size of the user blocks allocated for the first time is the number of the CPUs. The number of user blocks included in each of the CPUs is an integer value acquired by dividing the total number of user devices of a user group by the square of the number of the CPUs with no remainder, so that the same number of user blocks is allocated by each of the CPUs.

The second allocation includes that, if there are still user devices remained after the first allocation, a number of user devices are allocated to each of the CPUs, wherein the number of the allocated user devices this time is an integer value acquired by dividing the number of the remaining user devices by the number of the CPUs, wherein the number of the user blocks allocated for the second time is an integer value acquired by dividing the number of the user devices remained after the first allocation by the number of the CPUs, and one user block is allocated for the second time for each of the CPUs.

If there are still user devices remained after the second allocation, the remaining user devices are processed separately. The operation that the remaining user devices are processed separately includes that the remaining user devices in each user group are allocated as a whole so that the CPUs allocate substantially the same number of user devices. At most one user device is allocated to each of the CPUs during an allocation process, that is, zero or one user device is allocated to each of the CPUs during the allocation process.

Specifically, all user groups may be maintained by a user group data link table. Each of the nodes of the link table corresponds to all user groups and corresponds to one CPU. The number of nodes of the link table is the number of CPUs, and each of the nodes of the link table includes a block and a mark as well as a tail and a mark, wherein if a user device needs to be added, the pre-added user device is classified as a new user group using a certain time as a unit. If a user device needs to be deleted, a CPU corresponding to a node having a large tail and mark is deleted preferentially.

The block and mark of each of the nodes of the link table are for recording the sum of the total numbers of the user devices allocated for the first time and for the second time corresponding to the CPUs in each user group. That is, the block and mark of each of the nodes of the link table are for recording the sum of the products of the sizes of the user blocks multiplied by the number of user blocks allocated for the first time by the corresponding CPUs in the address pools, and are for recording the sum of the products of the sizes of the user blocks multiplied by the number of user blocks allocated for the second time by the corresponding CPUs.

The tail and the mark of each of the nodes of the link table are for recording the sum of tail marks corresponding to the CPUs in the user groups.

The user group data link table is configured to judge a CPU on which a user device is deleted. Deletion is performed preferentially on a CPU corresponding to a node having a large tail and mark if a user device needs to be deleted. Specifically, deletion is performed preferentially on a CPU corresponding to a node with a tail mark of 1 if a user device needs to be deleted randomly when a single user group is maintained.

The operation that the deletion is performed preferentially on the CPU corresponding to the node with a tail mark of 1 if the user device needs to be deleted randomly when the single user drop is maintained includes that:

if one user device is deleted from the user group, a node where a pre-deleted user device is located is searched, and whether a tail mark of the node is 1 is checked, and if it is 1, then the user device is deleted and the tail mark of the node is updated from 1 to 0; if it is not 1, then an operation in a situation that the number of user devices deleted from the user group is larger than the number of the user blocks allocated for the first time is executed;

if the number of the user devices deleted by the user group is larger than 1, and smaller than or equal to the number of the user blocks allocated for the first time and if pre-deleted user devices are distributed on different nodes, and tail marks of the nodes where the pre-deleted user devices are distributed are all 1, then the pre-deleted user devices are deleted and the tail marks of the nodes where the pre-deleted user devices are distributed are updated from 1 to 0. If the pre-deleted user devices are not distributed on different nodes or not all tail marks of the nodes where the pre-deleted user devices are distributed are 1, then an operation in a situation that the number of the user devices deleted by the user group is larger than the number of the user blocks allocated for the first time is executed.

If the number of the user devices deleted from the user group is larger than the number of the user blocks allocated for the first time, then the user devices are reallocated according to a difference between the total number of the original user devices of the user group and the number of the pre-deleted user devices.

It may be learned from the foregoing that, resources of the user devices are loaded in a balanced manner on different CPUs, and the largest difference of the number of the user devices is 1. Generation and updating of a user data link are similar as generation and updating of the public network address resource data link, and will not be described repeatedly here.

Figure 4:
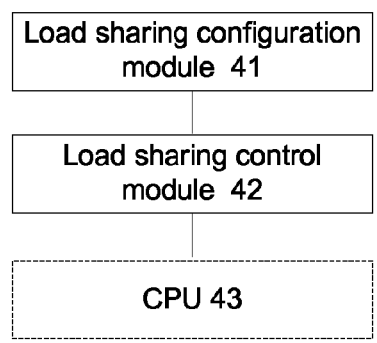
FIG. 4 is a structural diagram of components of a load sharing apparatus according to an embodiment of the present disclosure.

FIG. 4 is a structural diagram of components of a load sharing apparatus according to an embodiment of the present disclosure. As shown in FIG. 4, the device includes a load sharing configuration module 41, a load sharing control module 42 and CPUs 43, wherein the load sharing configuration module 41 is configured to configure public network addresses in a form of address pools; and is further configured to group user devices according to traffic models transmitted by the user devices;

wherein each of the address pools includes a plurality of address blocks, each of the plurality of address blocks corresponds to one CPU, each user group includes a plurality of user blocks, and each of the plurality of user blocks corresponds to one CPU; and the load sharing control module 42 is configured to transmit load sharing control information to the CPUs 43, so as to control the CPUs to share loads.

The load sharing control module 42 is specifically configured to generate, according to public network address resource data links, a public network address resource load sharing marker table; and to generate, according to user data links, a user device load sharing marker table, and to deliver to the CPUs 43, the load sharing control information generated according to the public network address resource load sharing marker table and the user device load sharing marker table.

The CPUs 43 are configured to allocate the public network addresses for the user devices according to the received load sharing control information, and translate private network addresses of the user devices into the public network addresses.

Specifically, each of the address pools corresponds to one public network address resource data link, the number of nodes of the public network address resource data link is the number of CPUs, each of the nodes corresponds to one CPU, and each of the nodes includes a block mark and a tail mark.

Each user group corresponds to one user data link, the number of nodes of the user data link is the number of CPUs, each of the nodes corresponds to one CPU, and each of the nodes includes a block mark and a tail mark.

In practical application, the load sharing configuration module 41 and the load sharing control module 42 may be set in a CGN device.

In practical application, the load sharing apparatus may be set in the CGN device. Both the load sharing configuration 41 and the load sharing control module 42 may be implemented by a CPU, a Digital Signal Processor (DSP) or a Field Programmable Gate Array (FPGA) of the CGN device.

Figure 5:
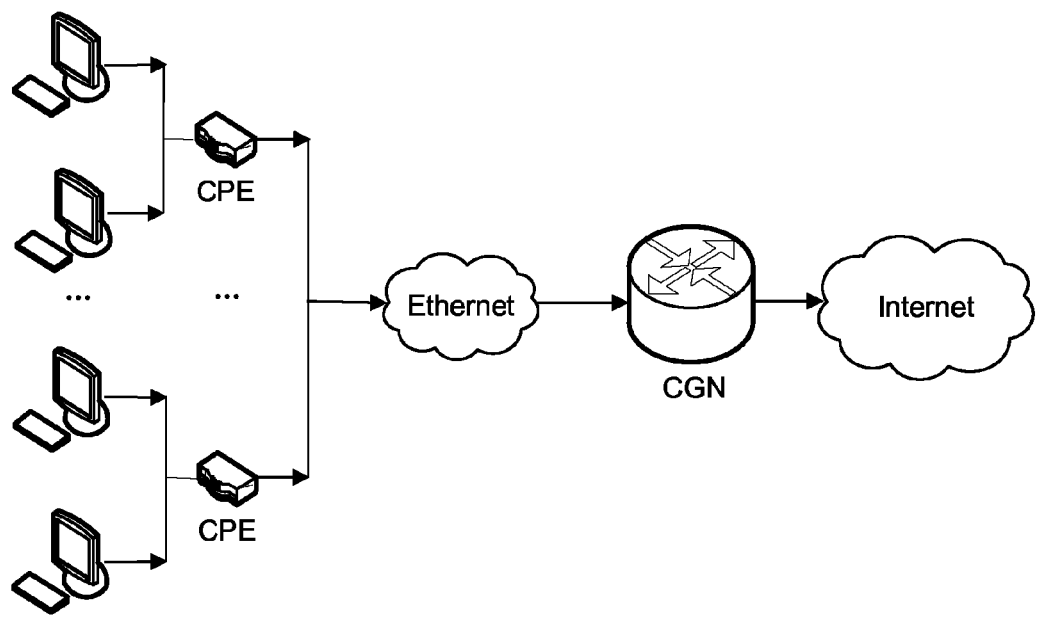
FIG. 5 is a schematic diagram of load sharing of CGN according to an embodiment of the present disclosure.

FIG. 5 is a schematic diagram of load sharing of CGN according to an embodiment of the present disclosure. In the present embodiment, the type of the CGN device may be Ds-lite CGN, NAT44, Bras nat44, NAT64 and so on. A private network address corresponding to a user device may be IPv4, IPv6 and so on. The CGN device is a multi-task processing unit, and each processing unit includes a plurality of CPUs.

As shown in FIG. 5, a load sharing configuration module configures public network addresses in a form of address pools first, and shares resources of the public network addresses among CPUs of different processing units in the CGN device, wherein the number of the address pools may be set according to a practical requirement. In the meanwhile, types of users may be further configured. The types of the users are private network address types corresponding to user devices. The user devices are also divided by applying a dynamic load sharing form, that is, the user devices are shared among different CPUs. A load sharing control module generates a load sharing marker table and transmits information of the marker table to corresponding CPUs. By means of the foregoing processing, each of the CPUs shares a substantially balanced number of public network addresses, and each of the CPUs also processes a substantially balanced number of user devices.

The above are only preferred embodiments of the present disclosure, and are not used for limiting the protection scope of the present disclosure. Therefore, any modification, equivalent replacement, improvement and so on made according to principles of the present disclosure should be included within the scope of protection of the present disclosure.

INDUSTRIAL APPLICABILITY

In the embodiments of the present disclosure, public network addresses are configured in a form of address pools; and after traffic transmitted by user devices is received, the user devices are grouped according to traffic models transmitted by the user devices; CPUs allocate the public network addresses to the user devices and translate private network addresses of the user devices into the public network addresses, wherein each of the address pools includes a plurality of address blocks, each of the plurality of address blocks corresponds to one CPU, each user group includes a plurality of user blocks, and each of the plurality of user blocks corresponds to one CPU. In this way, uneven sharing of public network address resources among a plurality of CPUs and loads of user devices can be avoided, thereby not only improving the processing speed of the CPUs for address translation, but also obtaining a better load sharing effect.

What is claimed is:

1. A load sharing method, comprising:
configuring public network addresses in a form of address pools;
after receiving traffic transmitted by user devices, grouping the user devices according to traffic models transmitted by the user devices; and
allocating, by Central Processing Units (CPU), the public network addresses for the user devices, and translating private network addresses of the user devices into the public network addresses,
wherein each of the address pools comprises a plurality of address blocks, each of the plurality of address blocks corresponds to one CPU, each user group comprises a plurality of user blocks, and each of the plurality of user blocks corresponds to one CPU.

2. The method according to claim 1, further comprising:
generating, according to address resource data links corresponding to the address pools, a public network address resource load sharing marker table, and generating, according to user data links corresponding to user groups, a user device load sharing marker table, wherein the address resource data links are generated according to the address pools and the user data links are generated according to the user groups;
transmitting to the CPUs, load sharing control information generated according to the public network address resource load sharing marker table and the user device load sharing marker table;
correspondingly, the operation of allocating, by CPUs, the public network addresses for the user devices, and translating private network addresses of the user devices into the public network addresses comprises:
allocating, by the CPUs, according to the load sharing control information, the public network addresses for the user devices, and translating the private network addresses of the user devices into the public network addresses.

3. The method according to claim 1, wherein each of the CPUs corresponds to substantially the same number of public network addresses in each of the address pools; and a specific implementation method comprises:
allocating a number of public network addresses to each of the CPUs, wherein the number of the allocated public network addresses is a product of multiplying an integer value, which is acquired by dividing the total number of public network addresses of a current address pool by the square of the number of the CPUs, by the number of the CPUs; if there are still remaining public network addresses, allocating a number of public network addresses to each of the CPUs, wherein the number of the allocated public network addresses is an integer value acquired by dividing the remaining the public network addresses by the number of the CPUs; if there are still remaining public network addresses, allocating the remaining public network addresses in each of the address pools as a whole so as to make each of the CPUs correspond to substantially the same number of public network addresses.

4. The method according to claim 1, wherein the CPUs share substantially the same number of user devices, and a specific implementation method comprises:
allocating a number of user devices to each of the CPUs, wherein the number of the allocated user devices is a product of multiplying an integer value, which is acquired by dividing the total number of user devices of a current user group by the square of the number of the CPUs, by the number of the CPUs; if there are still remaining user devices, allocating a number of user devices to each of the CPUs, wherein the number of the allocated user devices is an integer value acquired by dividing the remaining user devices by the number of the CPUs; if there are still remaining user devices, allocating the remaining user devices in each user group as a whole so as to allocate substantially the same number of user devices to each of the CPUs.

5. The method according to claim 1, wherein each of the address pools corresponds to one public network address resource data link, the number of nodes of the public network address resource data link is the number of CPUs, each of the nodes corresponds to one CPU, and each of the nodes comprises a block mark and a tail mark.

6. The method according to claim 1, wherein each user group corresponds to one user data link, the number of nodes of the user data link is the number of CPUs, each of the nodes corresponds to one CPU, and each of the nodes comprises a block mark and a tail mark.

7. A load sharing apparatus, comprising a load sharing configuration module, a load sharing control module and Central Processing Units (CPU), wherein
the load sharing configuration module is configured to configure public network addresses in a form of address pools, and to group user devices according to traffic models transmitted by the user devices;
wherein each of the address pools comprises a plurality of address blocks, each of the plurality of address blocks corresponds to one CPU, each user group comprises a plurality of user blocks, and each of the plurality of user blocks corresponds to one CPU;
the load sharing control module is configured to transmit load sharing control information to the CPUs; and
the CPUs are configured to allocate the public network addresses for the user devices according to the load sharing control information, and translate private network addresses of the user devices into the public network addresses.

8. The apparatus according to claim 7, wherein the load sharing control module is configured to generate, according to public network address resource data links, a public network address resource load sharing marker table;
and to generate, according to user data links, a user device load sharing marker table, and deliver to the CPUs, the load sharing control information generated according to the public network address resource load sharing marker table and the user device load sharing marker table.

9. The apparatus according to claim 7, wherein each of the address pools corresponds to one public network address resource data link, the number of nodes of the public network address resource data link is the number of CPUs, each of the nodes corresponds to one CPU, and each of the nodes comprises a block mark and a tail mark;
each user group corresponds to one user data link, the number of nodes of the user data link is the number of CPUs, each of the nodes corresponds to one CPU, and each of the nodes comprises a block mark and a tail mark.

10. The apparatus according to claim 7, wherein the load sharing configuration module and the load sharing control module are set in a Carrier Grade Network Address Translation (CGN) device.

11. The method according to claim 2, wherein each of the address pools corresponds to one public network address resource data link, the number of nodes of the public network address resource data link is the number of CPUs, each of the nodes corresponds to one CPU, and each of the nodes comprises a block mark and a tail mark.

12. The method according to claim 3, wherein each of the address pools corresponds to one public network address resource data link, the number of nodes of the public network address resource data link is the number of CPUs, each of the nodes corresponds to one CPU, and each of the nodes comprises a block mark and a tail mark.

13. The method according to claim 4, wherein each of the address pools corresponds to one public network address resource data link, the number of nodes of the public network address resource data link is the number of CPUs, each of the nodes corresponds to one CPU, and each of the nodes comprises a block mark and a tail mark.

14. The method according to claim 2, wherein each user group corresponds to one user data link, the number of nodes of the user data link is the number of CPUs, each of the nodes corresponds to one CPU, and each of the nodes comprises a block mark and a tail mark.

15. The method according to claim 3, wherein each user group corresponds to one user data link, the number of nodes of the user data link is the number of CPUs, each of the nodes corresponds to one CPU, and each of the nodes comprises a block mark and a tail mark.

16. The method according to claim 4, wherein each user group corresponds to one user data link, the number of nodes of the user data link is the number of CPUs, each of the nodes corresponds to one CPU, and each of the nodes comprises a block mark and a tail mark.

17. The apparatus according to claim 8, wherein each of the address pools corresponds to one public network address resource data link, the number of nodes of the public network address resource data link is the number of CPUs, each of the nodes corresponds to one CPU, and each of the nodes comprises a block mark and a tail mark;

each user group corresponds to one user data link, the number of nodes of the user data link is the number of CPUs, each of the nodes corresponds to one CPU, and each of the nodes comprises a block mark and a tail mark.

18. The apparatus according to claim 8, wherein the load sharing configuration module and the load sharing control module are set in a Carrier Grade Network Address Translation (CGN) device.

* * * * *